United States Patent
Chin et al.

(10) Patent No.: US 10,685,086 B2
(45) Date of Patent: Jun. 16, 2020

(54) AVOIDING WATER BREAKTHROUGH IN UNCONSOLIDATED SANDS

(71) Applicant: CONOCOPHILLIPS COMPANY, Houston, TX (US)

(72) Inventors: Lee Chin, Houston, TX (US); Michael E. Vienot, Glenview, IL (US)

(73) Assignee: CONOCOPHILLIPS COMPANY, Houston, TX (US)

(*) Notice: Subject to any disclaimer, the term of this patent is extended or adjusted under 35 U.S.C. 154(b) by 632 days.

(21) Appl. No.: 15/263,489

(22) Filed: Sep. 13, 2016

(65) Prior Publication Data
US 2017/0076022 A1    Mar. 16, 2017

Related U.S. Application Data

(60) Provisional application No. 62/218,834, filed on Sep. 15, 2015.

(51) Int. Cl.
*G06F 17/50* (2006.01)
*E21B 43/20* (2006.01)

(52) U.S. Cl.
CPC ......... *G06F 17/5009* (2013.01); *E21B 43/20* (2013.01); *G06F 17/5018* (2013.01)

(58) Field of Classification Search
CPC ... G06F 17/5009; G06F 17/5018; E21B 43/20
USPC ......................................................... 703/10
See application file for complete search history.

(56) References Cited

U.S. PATENT DOCUMENTS

| | | | |
|---|---|---|---|
| 7,825,659 B2 | 11/2010 | Georgi | |
| 2009/0265152 A1 | 10/2009 | Cacas | |
| 2010/0076738 A1 | 3/2010 | Howard et al. | |
| 2010/0088076 A1* | 4/2010 | Koutsabeloulis | E21B 43/00 703/2 |
| 2010/0217563 A1 | 8/2010 | Montaron | |
| 2010/0250206 A1 | 9/2010 | Yogeswaren | |
| 2011/0011595 A1* | 1/2011 | Huang | E21B 43/00 166/369 |
| 2012/0203524 A1* | 8/2012 | Chin | E21B 43/2406 703/2 |

(Continued)

FOREIGN PATENT DOCUMENTS

| | | |
|---|---|---|
| WO | 2004076815 A1 | 9/2004 |
| WO | 2007018858 A2 | 2/2007 |
| WO | 2007018860 A2 | 2/2007 |

(Continued)

OTHER PUBLICATIONS

J.P. Yang, W.Z. Chen, "Study of statistic damage constitutive model for shear failure rock" 2011; Materials Research Innovations 2011, vol. 15, 5 pages.*

(Continued)

*Primary Examiner* — Dwin M Craig

(74) *Attorney, Agent, or Firm* — ConocoPhillips Company

(57) ABSTRACT

The proposed method is an improved method of flooding weak reservoirs and avoiding premature breakthrough of the displacing fluid used in the flooding operation by first modeling the performance of the reservoir under a rage of flooding pressures in a couple geomechanic and multiphase flow model. Ideal pressures are thus selected from use in a flooding operation, thus avoiding rock failure and fluid breakthrough.

20 Claims, 4 Drawing Sheets

(56) References Cited

U.S. PATENT DOCUMENTS

| | | |
|---|---|---|
| 2013/0211807 A1 | 8/2013 | Templeton-Barrett |
| 2014/0345862 A1 | 11/2014 | Jerauld |

FOREIGN PATENT DOCUMENTS

| | | |
|---|---|---|
| WO | 2007018862 A2 | 2/2007 |
| WO | 2010033710 A2 | 3/2010 |
| WO | 2011035146 A2 | 3/2011 |

OTHER PUBLICATIONS

SPE-79709—Dean, R.H. et al., A Comparison of Techniques for Coupling Porous Flow and Geomechanics (2006).

SPE-141268-PA—Kim J., et al., Rigorous Coupling of Geomechanics and Multiphase Flow with Strong Capillarity. (2013).

Wang & Zhao, Failure Behavior and Constitutive Model of Weakly Consolidated Soft Rock The Scientific World Journal 2013 (2013).

J P Yang W Z Chen, Study of statistic damage constitutive model for shear failure rock Material s Research Innovations 5 (s1):s565-s568 (2011).

Susan E. Minkoff et al., Coupled fluid flow and geomechanical deformation modeling, Journal of Petroleum Science and Engineering, vol. 38, Issues 1-2, 2003, pp. 37-56.

Martinez, A.J., et al., Coupled multiphase flow and geomechanics model for analysis of joint reactivation during CO2 sequestration operations, International Journal of Greenhouse Gas Control 17: 148-160 (2013).

International Search Report for related case, App. No. PCT/US2016/051657, dated Feb. 12, 2016.

Chin, Iterative Coupled Analysis of Geomechanics and Fluid Flow for Rock Compaction in Reservoir Simulation, Oil & Gas Science and Technology, Sep. 1, 2002, vol. 57, No. 5, pp. 485-497.

Collins, Geomechanical Effects on the SAGD Process, SPE Reservoir Evaluation & Engineering, Aug. 1, 2007, pp. 367-375.

Longuemare, Geomechanics in Reservoir Simulation: Overview of Coupling Methods and Field Case Study, Oil & Gas Science and Technology, Sep. 1, 2002, vol. 57, No. 5, pp. 471-483.

Lee, Coupled Pressure-Transient Behavior and Geomechanical Deformation in the Near-Borehole Region of Unconsolidated Clastic Rock Formations, SPE 102904, 2006, 10 pp.

Kim, Jihoon—"Sequential Methods for Coupled Geomechanics and Multiphase Flow", 2010, Thesis, Sanford University, 274 pgs.

\* cited by examiner

101 Coupled Multiphase Flow and Geomechanics model including:
1) Reservoir simulator, 2) Geomechanics model,
3) Constitutive model + 4) Permeability model

102 Input Key Reservoir Characteristics of weak reservoir into model

103 Simulate flooding operation in model under a range of injection and production pressures

104 Calculate reservoir performance in each simulation above

105 Select optimal injection and production P for use in flooding operation in said weak reservoir

106 Use said selected optimal P in flooding weak reservoir

AVOIDING WATER BREAKTHROUGH IN UNCONSOLIDATED SANDS

PRIORITY CLAIM

This application is a non-provisional application which claims benefit under 35 USC § 119(e) to U.S. Provisional Application Ser. No. 62/218,834 filed Sep. 15, 2015, entitled "AVOIDING WATER BREAKTHROUGH IN UNCONSOLIDATED SANDS," which is incorporated herein in its entirety.

FEDERALLY SPONSORED RESEARCH STATEMENT

Not Applicable

FIELD OF THE INVENTION

The invention relates to enhanced oil recovery techniques, and, in particular, to water flooding techniques in unconsolidated sands where early water breakthrough is a significant risk and modeling methods to avoid or reduce this risk.

BACKGROUND OF THE INVENTION

World reserves for unconventional oil are estimated to be over 3 times greater than those of conventional oil. As conventional oil sources become scarce or economically non-viable, unconventional (heavy and extra-heavy) oil sources need to be explored in order to supply the world's growing oil demands. However, such unconventional deposits are typically more difficult and expensive to produce.

Heavy oil is a special class of this unconventional oil that has viscosity ranging from about 50-50,000 mPa. Heavy oil reservoirs are often found in high porosity, high permeability, unconsolidated sand deposits. Exemplary oil fields with unconsolidated sands and heavy oils include e.g., the West Sak and Ugnu oil sands in Alaska.

The "West Sak" is the informal name applied to a sequence of oil-bearing very fine to fine grained, unconsolidated sandstones and moderately indurate siltstones and mudstones of Late Cretaceous age (Maastrichtian) that were discovered in 1971 through the drilling and testing of the West Sak No. 1 well. Above the West Sak sands lie the Ugnu sands, also informally named, and containing Maastrichtian Paleocene sands. The Ugnu sands, at depths of 2,000 to 5,000 ft, and the West Sak, from 2,300 to 5,500 ft, both overlay the Kuparuk field (which has been producing since 1981) and under-laying 1,800 ft of Permafrost. The combined thickness of the West Sak and Ugnu formations averages 1,050 ft. These two formations are oil-bearing primarily in the Kuparuk River and Milne Point units.

West Sak is fine to fine-grained sand with interbedded mudstone and claystone deposited as fluvial-deltaic sands. Its porosity averages less than 20%, and the permeability is 10 to 140 millidarcies. It contains intermediate to slightly heavy oil of 50 to 3,000 cP (14'-22.5' API gravity) at a reservoir temperature of 45°-100° F.

Ugnu is unconsolidated sand. Its average porosity is 25%, and the permeability is very high. It contains viscous heavy oil—that can be classified as bitumen or extra heavy oil of several thousand cP viscosity (7' to 12' API gravity) at a reservoir temperature range of slightly lower than 45° to 65° F.

At reservoir conditions, oil may contain dissolved solution gas, thus some oil can be initially recovered using the energy from heavy oil solution gas drive. At the end of primary production, however, a significant fraction of oil still exists for potential secondary recovery.

While there are many secondary recovery techniques, waterflooding is popular because water is usually cheap and readily available. As seen in FIG. 1, water is injected into an injection well to drive oil production towards a nearby production well. Various well arrangements are possible, as shown in FIG. 2, but the basic idea is drive the oil from an area surrounding a production well towards that well.

During waterflooding, water is injected in order to increase the production from oil reservoirs. This is accomplished by "voidage replacement"—injection of water to increase the reservoir pressure to its initial level and maintain it near that pressure. The water displaces oil from the pore spaces, but the efficiency of such displacement depends on many factors (e.g., oil viscosity, displacing fluid chemistry, and rock characteristics).

One of the difficulties with using waterflooding in unconsolidated sands or other "weak" reservoirs is that injection pressures may exceed the strength of rock, resulting in rock breakdown and early water breakthrough. Once this occurs, water typically travels the least restrictive route and no longer functions to drive oil production.

SUMMARY OF THE INVENTION

The present invention describes a quantitative method for determining optimal injection/production pressures and/or rates to prevent early water breakthrough for waterflood operation in weak rock reservoirs. The method can generally be described as a modeling method that utilizes coupled geomechanics and multiphase flow model to simulate reservoir response over a range of injection and production pressures and rates of flow between the injector(s) and the producer(s). The simulation results are used to find optimal injection and production pressures that can then be employed in the field to minimize rock failure and water breakthrough.

The integration of geomechanics with reservoir simulation is generally referred to as the "coupling" of a geomechanical model. Conventional reservoir simulators normally do not incorporate deformation and stress changes in response to pressure, saturation and temperature changes, but instead assume that the mechanical properties do not change. The properties related to geomechanics like porosity are solely computed from rock compressibility and this is not accurate. A variety of methodologies have been introduced to take geomechanics into account.

Several commercial and research reservoir simulators have been integrated with geomechanics in recent years. However, these coupled models tend to fail to provide adequately accurate results because they have sacrificed computation simplicity for accuracy.

In more detail, the present method can be described as follows:

1. Provide a coupled geomechanics and multiphase flow model for the given weak rock reservoir. The coupled model includes the injection wells and the production wells under waterflood operation. The coupled model is capable of simulating the process of waterflood, rock deformation and rock failure in the weak rock reservoir.

The key components of the coupled model consist of 1) a reservoir simulator for quantifying the water injection/oil production operation, e.g., the various flows relating to same, 2) a geomechanics simulator for quantifying the rock deformation and rock failure induced by the waterflood operation, 3) a constitutive model for the weak reservoir rock for simulating the rock failure mechanisms that include the dilation mechanism, the tensile failure mechanism, and the shear failure mechanism, and 4) a permeability model that can quantify the permeability change induced by these rock failure mechanisms. A thermal module may also be included when used with thermal stimulation techniques.

The reservoir simulator and the geomechanics simulator can be commercially available tools and/or can be developed by using numerical methods based on the knowledge in reservoir simulation and geomechanics simulation. The constitutive model for weak reservoir rock can be developed by rock mechanics laboratory tests and/or be existing theoretical models. The permeability model can be developed based on laboratory tests and/or can use existing theoretical models.

2. Obtain and input the key physical parameters of the weak reservoir for the coupled model. These key physical parameters can include a plurality of the following: 1) reservoir in-situ stresses—vertical stress, maximum horizontal stress, and minimum horizontal stress, 2) reservoir depth and thickness, 3) reservoir horizontal and vertical permeability prior to starting water injection, 4) reservoir rock strength parameters, including at least the cohesion and internal friction angle, 5) stress strain curves for the weak reservoir rock under the loading conditions of the flooding operation, 6) reservoir rock mechanical properties, including at least Young's modulus and Poisson's ratio, 7) the distances and orientation between the injector(s) and the producer(s), 8) reservoir porosity, 9) reservoir pore-pressure prior to starting water injection, 10) injection well pressure or injection rate (these are interchangeable), 11) production well pressure or production rate, 12) reservoir fluid compressibility, 13) relative permeability curves, and 14) reservoir fluid P-V-T data, 15) chemistry of the displacing fluid, and the like.

Depending upon the availability, values of these parameters can be acquired from various methods, such as laboratory tests on e.g., core samples, deduction from well log data, using correlation equations, and/or field measurements, and combinations of same.

3. Conduct simulation runs by using the coupled geomechanics and multiphase flow model described in step 1 for the specified area of a given weak rock reservoir under flooding operations over a reasonable range of injection/production pressures or rates between the injector(s) and the producer(s). The specified area can be any part of the oil field under flood.

4. For each injection/production case simulated, distributions of stress, strain, volumetric plastic strain, porosity, pressure, and water saturation in the reservoir of the waterflood area are calculated as functions of time. The water breakthrough time and cumulative oil production are also calculated.

5. From the simulation results calculated in step 4 for all the simulation runs covered by the range of injection/production pressures/rates designed in step 3, optimal injection/production pressures/rates for flooding operation that prevent early fluid breakthrough in weak rock reservoirs and give high oil production and low operating cost, can be determined.

6. The selected parameters are then used in actual field development.

Although we have described the method herein as relates to waterflooding projects, the method need not be limited to water or brine use, and can be used in with other secondary recovery techniques.

For example, other chemicals, such as polymers or polyols, can be used to further increase the viscosity of the displacing phase solution. Alternatively, chemicals can be added to change the wettability of the rock, or to reduce the viscosity of the oil. Thus, polymer flooding, chemical flooding, alternating liquid slugs with a gas such as $CO_2$ or light hydrocarbons, and the like, can all be used with the method herein.

For example, a viscous polyol can be used to improve sweep efficiency. For example, glycerol, glycerol derivatives, polyglycerols or a mixture thereof is used as a viscous displacing phase in a chemical flood. Examples of glycerol derivatives include esters, acetals, ethers and amines. Polyglycerols including diglycerol, polyglycerol-3 and polyglycerol-4 are also capable of increasing the viscosity of the displacing phase. Additionally, the above-mentioned polyols can be mixed to increase the range of oil viscosities that are recoverable.

Polymer flooding is a chemical EOR technique applied in medium heavy oil reservoirs. The objective of the process is to improve the mobility contrast between the oil and the aqueous phase, and hence improve the displacement sweep efficiency. In moderately heterogeneous reservoirs, polymer flooding is also applied to improve the volumetric sweep efficiency. Typically, a slug of polymer (such as guar gum, polyacrylamide) is injected (0.5-1 PV), and chased by water. In some cases, optimization is also possible by grading the polymer, i.e. progressively decreasing the polymer concentration (and hence viscosity) in order to optimize the flood economics.

Caustic flooding can also be used with the invention. In caustic flooding, an alkaline chemical such as (sodium hydroxide, sodium orthosilicate or sodium carbonate) is injected during polymer flooding or water flooding operations. The chemical reacts with certain types of oils, forming surfactants that reduce the interfacial tension between oil and water and trigger an increase in oil production, and caustic flooding is typically used in sandstone reservoirs.

The method can also be combined with thermal EOR techniques. In another embodiment, thermal methods are used to decrease the viscosity of the oil before the displacing phase is injected. This includes methods such as steam floods, cyclic steam floods, SAGD, and variants thereof.

The term "reservoir simulator" as used herein is used in a manner consistent with its use in the oil and gas industry, and refers to an area of reservoir engineering in which computer models are used to predict the flow of fluids (typically, oil, water, and gas) through porous media. Traditional finite difference (FD) simulators dominate both theoretical and practical work in reservoir simulation. Conventional FD simulation is underpinned by three physical concepts: conservation of mass, isothermal fluid phase behavior, and the Darcy approximation of fluid flow through porous media. Thermal simulators (most commonly used for heavy oil applications) add conservation of energy to this list, allowing temperatures to change within the reservoir, and these are usually used in Alaskan oil sands, and other heavy oil deposits.

Many private, open source or commercial software platforms are available for reservoir simulation. The most well known open source packages include:

BOAST—Black Oil Applied Simulation Tool (Boast) simulator is a free software package for reservoir simulation available from the U.S. Department of Energy. Boast is an IMPES numerical simulator (finite-difference implicit pressure-explicit saturation) that finds the pressure distribution for a given time step first then calculates the saturation distribution for the same time step isothermal. The last release was in 1986 but it remains as a good simulator for educational purposes.

MRST—The MATLAB Reservoir Simulation Toolbox (MRST) is developed by SINTEF Applied Mathematics as a MATLAB® toolbox. The toolbox consists of two main parts: a core offering basic functionality and single and two-phase solvers, and a set of add-on modules offering more advanced models, viewers and solvers. MRST is mainly intended as a toolbox for rapid prototyping and demonstration of new simulation methods and modeling concepts on unstructured grids.

OPM—The Open Porous Media (OPM) initiative provides a set of open-source tools centered around the simulation of flow and transport of fluids in porous media.

The best known commercial packages include:

CMG Suite (IMEX, GEM and STARS)—Computer Modeling Group currently offers three simulators: a black oil simulator, called IMEX, a compositional simulator called GEM and a thermal compositional simulator called STARS.

ECLIPSE is an oil and gas reservoir simulator originally developed by ECL (Exploration Consultants Limited) and currently owned by SIS, a division of Schlumberger. The name ECLIPSE originally was an acronym for "ECL's Implicit Program for Simulation Engineering". Simulators include black oil, compositional, thermal finite-volume, and streamline simulation. Add-on options include local grid refinements, coalbed methane, gas field operations, advanced wells, reservoir coupling, and surface networks.

Landmark Nexus—Nexus is an oil and gas reservoir simulator originally developed as 'Falcon' by Amoco, Los Alamos National Laboratory and Cray Research. It is currently owned, developed, marketed and maintained by Landmark Graphics, a product service line of Halliburton.

Stochastic Simulation ResAssure—ResAssure is a stochastic simulation software solution, powered by a robust and extremely fast reservoir simulator. The staggering speed-up is achieved by innovative numerical solutions and advanced mathematical formulations for solving subsurface challenges.

Rock Flow Dynamics tNavigator supports black oil, compositional and thermal compositional simulations for workstations and High Performance Computing clusters. The simulation software is expected to rely a specific type of data file for reservoir input and parameters. The workflow and tool in the spreadsheet will automatically generate this data file format when interfaced with the chosen simulation program.

As used herein, a "geomechanics simulator" is a simulator or model that accounts for in situ stresses, and effects on rock deformation and rock failure. Suitable geomechanic simulators include e.g., 3DEC (Itasca Consulting Group);

As used herein, a "constitutive model" refers to a stress strain model employing constitutive equations for simulating the rock failure mechanisms that include the dilation mechanism, the tensile failure mechanism, and the shear failure mechanism. Suitable models include J P Yang; W Z Chen Study of statistic damage constitutive model for shear failure rock Material s Research Innovations 5 (s1):s565-s568 (2011) or WANG & ZHAO, Failure Behavior and Constitutive Model of Weakly Consolidated Soft Rock The Scientific World Journal 2013 (2013).

Any rock failure criteria can be used herein, including e.g., Mohr-Coulomb, Hoeck-Brown, the Drucker-Prager model, Tresca criteria, Von Mises criterion, Weibols and Cook, Modified Lade Criterion, Coulomb-Navier failure criteria, and the like. Alternatively, experimental and curve fitting based criteria can be employed.

As used herein, a "permeability model" is a model that can quantify the permeability change induced by these rock failure mechanisms. A variety of models are available for use, including e.g., the Brooks-Corey and related models, Corey and Rathjens, the Chierici model, Correlations of Honarpour et al. and Ibrahim, the hysteresis models, Carman-Kozeny models, Network models, Models for three-phase relative permeability's, the Stone model or one of its variations, and the like.

The phrase "API gravity" is a measure of how heavy or light a petroleum liquid is. In general, if the API gravity is greater than 10, it is lighter than water (lower density); less than 10, it is heavier.

The term "displacing phase" is used to denote a fluid (liquid or gas) being injected into a reservoir to increase oil production by mobilizing the oil towards the production well. Both the sweep and displacement efficiency are used to describe the success of the displacing phase. The sweep efficiency of the reservoir depends on the mobility ratio between the displacing phase and the oil (displaced phase). In contrast, the displacement efficiency is dependent on the mobility ratio, the wettability of the rock, and the pore geometry.

The terms "oil" or "crude oil" as used herein broadly refers to liquid or solid hydrocarbons found in subsurface reservoirs. The terms "heavy oil," "extra-heavy oil" or "bitumen" are also used to refer specifically the viscous liquid or solid forms of hydrocarbons found in subsurface reservoirs.

The term "water" as used herein refers to all sources of water including produced water, brine, seawater or freshwater. Essentially, any type of water that does not contain high amounts of solid particulates (other than proppants) that can be injected into the reservoir formation can be used in flooding operations. Water sources with significantly high amounts of solid particulates can be used after undergoing a filtration or solid separation process.

As used herein, "flooding" refers to injecting a fluid into a reservoir for voidage replacement, and to provide a driving force for moving hydrocarbon to a production well. It includes the use of many different kinds of displacing fluids, such as water, brine, polymer, caustic solutions, and the like.

As used herein a "weak" reservoir is a reservoir having unconsolidated or weakly consolidated particulates, such that it is subject to rock failure at typical flooding pressures, resulting in premature breakthrough of the displacing fluid.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention, such as buffers, chelators, and the like.

The following abbreviations are used herein:

| | |
|---|---|
| PV | Pore volume |
| OOIP | Original Oil in Place |
| FD | Finite differences |
| DEM | Discrete Element Method |

BRIEF DESCRIPTION OF THE DRAWINGS

FIG. 4 is a schematic of the method.

DETAILED DESCRIPTION

Figure 1:
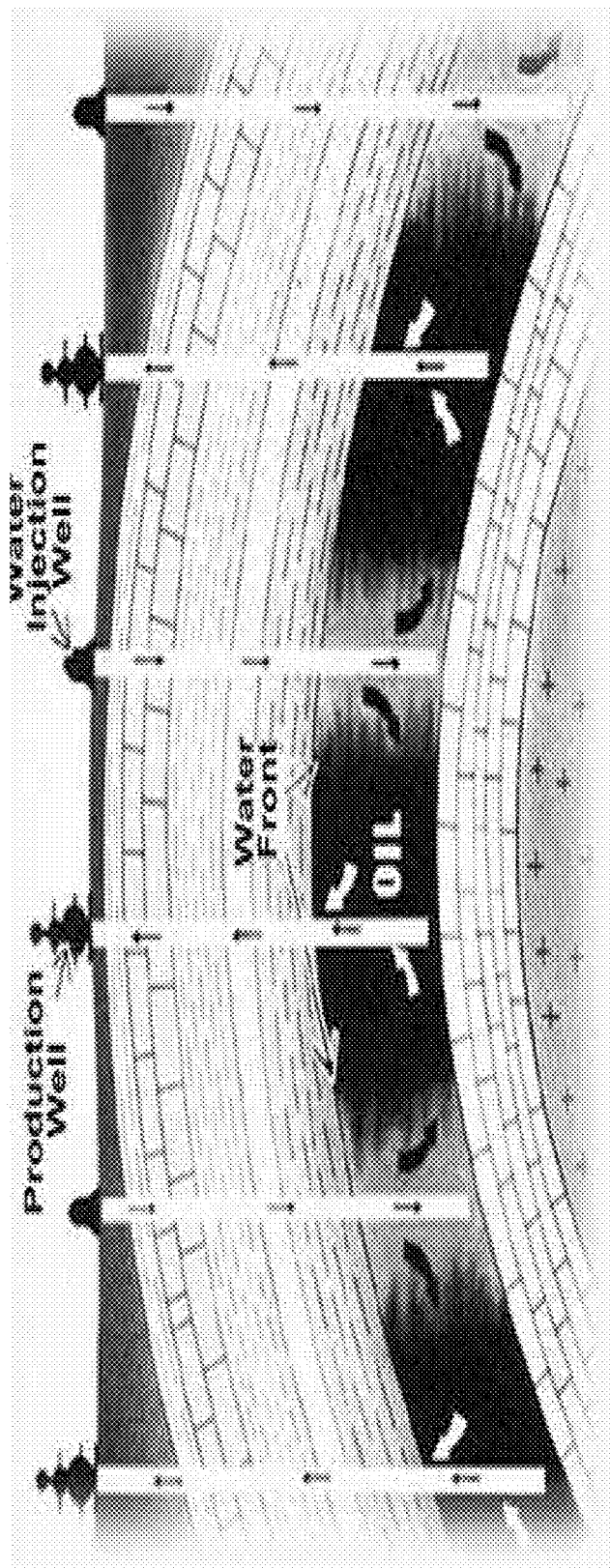
FIG. 1 Schematic of a polymer flood using a five-spot aerial pattern.
Figure 2:
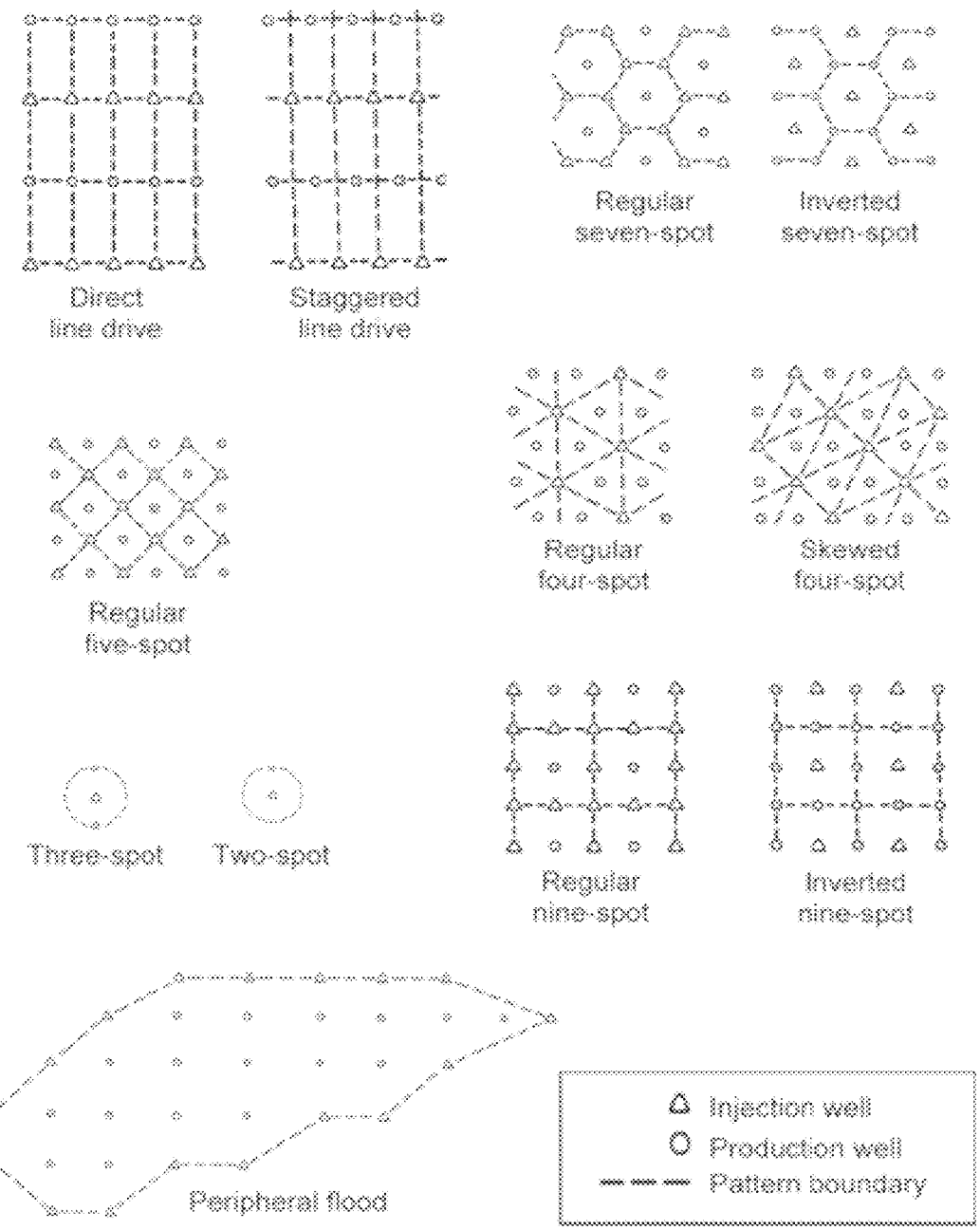
FIG. 2 Various well patterns for waterflood or chemical flood projects.

The present invention describes a method of enhancing heavy oil recovery by modeling the effect of waterflooding operations on the unconsolidated or weak reservoirs in order to avoid undesirable events such as early water breakthrough. Once optimal parameters are determined by running various simulations, those parameters can then be successfully employed in the field with reduced risk.

Generally speaking, the method uses a coupled geomechanical and multiphase fluid model, into which key reservoir parameters are inputted and then flooding simulations are run. Based on the results of the simulations, the optimal injection and production pressures or rates) can then be used in actual flooding operations of that reservoir, minimizing if not eliminating breakthrough.

The invention includes any one or more of the following embodiments, in any combinations thereof:

A method of reducing displacing fluid breakthrough in a flooding operation in a weak reservoir, said method comprising:
providing a coupled geomechanics and multiphase flow model ("coupled model") for a weak reservoir, said coupled model including injection well(s) and production well(s) and being capable of simulating a flooding operation using a displacing fluid and rock deformation and rock failure in said weak reservoir;
said coupled model comprising: a reservoir simulator for quantifying displacing fluid flow and oil flow in a flooding operation; a geomechanics simulator for quantifying rock deformation and rock failure induced by said flooding operation; a constitutive model for simulating the rock failure mechanisms including a dilation mechanism, a tensile failure mechanism, and a shear failure mechanism; and a permeability model that can quantify a permeability change induced by rock failure;
inputting key physical parameters of said weak reservoir into said coupled model;
simulating flooding operations using the coupled model over a range of injection and production pressures;
calculating for each simulation in step a distribution of stress, strain, volumetric plastic strain, porosity, pressure, and displacing fluid saturation over time and calculating water breakthrough time and cumulative oil production;
selecting an optimal injection and production pressure based on the results calculated in step e); and
employing said selected optimal injection and production pressures in a flooding operation for producing oil from said weak reservoir.

A method as herein described, said inputted key characteristics including a plurality or at least 6, 8, or 10 of: reservoir in-situ stresses including vertical stress, maximum horizontal stress, and minimum horizontal stress; reservoir depth and thickness; reservoir horizontal and vertical permeability prior to said flooding operation; reservoir rock strength parameters, including at least a cohesion and an internal friction angle; stress strain curves for the weak reservoir under loading conditions of the flooding operation; reservoir rock mechanical properties, including at least Young's modulus and Poisson's ratio; distances between injector well(s) and producer well(s); reservoir porosity and pore-pressure prior to said flooding operation; injection well pressure and production well pressure during said flooding operation; reservoir oil compressibility; relative permeability curves; reservoir oil P-V-T data, and chemistry of displacing fluid.

A method as herein described, said coupled model being fully coupled, iteratively coupled, staggered, or loosely coupled.

The method as herein described, said rock failure criteria being the Mohr-Coulomb criteria or being selected from the Hoeck-Brown, the Drucker-Prager model, Tresca criteria, Von Mises criterion, Weibols and Cook, Modified Lade Criterion, and the Coulomb-Navier failure criteria. Alternatively, the rock failure criteria being experimental and curve fitting based criteria.

A method as herein described, wherein water breakthrough is avoided more frequently than a similar weak reservoir not employing said method.

A non-transitory machine-readable storage medium having embodied thereon a program, which when executed by at least one processor of a computer, performs the steps of the method described herein.

The invention will now be described in additional detail.

Geomechanical models are governed by a vector field equation set that is solved using the finite element method. Conventional reservoir models like the black oil model and thermal model, however, are governed by balance equations of scalar fields. Thus, a method of coupling these two model types is needed. The interactions between flow and geomechanics have been modeled using various coupling schemes. Coupling methods are typically classified into four types: fully coupled, iteratively coupled, explicitly coupled, and loosely coupled.

Adaptability, computational effort and accuracy are the three aspects of coupling a geomechanical model with reservoir simulations. Different coupling schemes and models have different characteristics with respect to these three aspects. For example, a model or coupling scheme that has good adaptability and computational speed may not have the accuracy desired. There is a trade-off between these three aspects.

Figure 3:
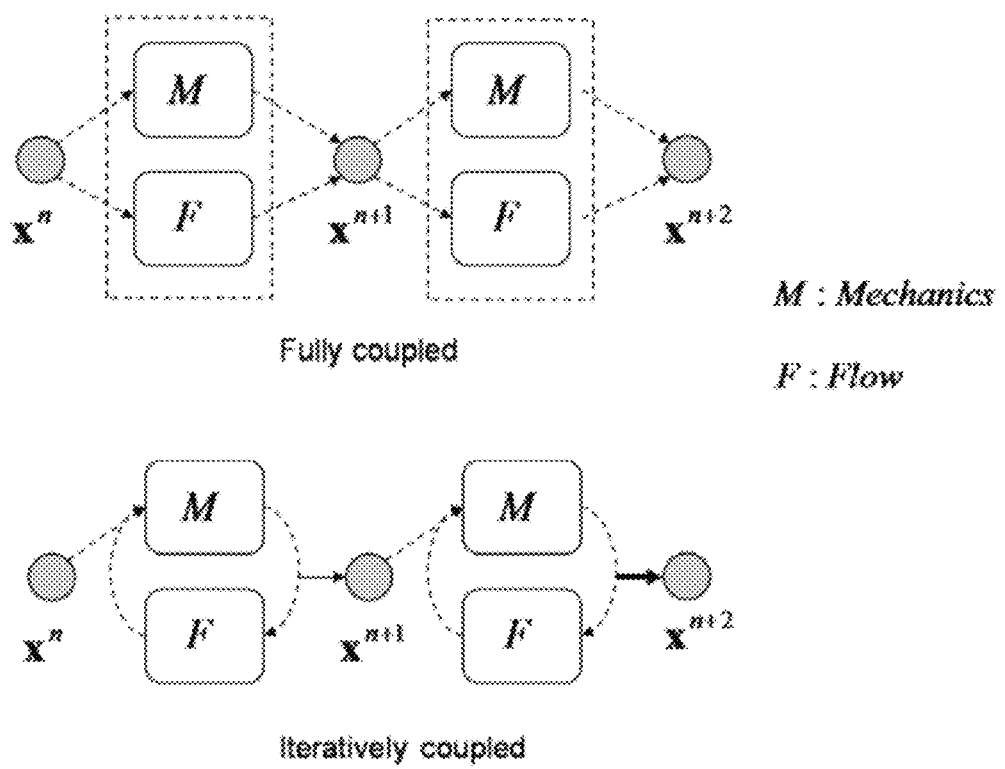
FIG. 3 schematics of the fully coupled (top) and the iteratively coupled (bottom) modeling methods.

In broad terms, the characteristics of the coupling methods are:

1. Fully Coupled (Simultaneous Solution). The coupled governing equations of flow and geomechanics are solved simultaneously at every time step (the top of FIG. 3). A converged solution is obtained through iteration, typically using the Newton-Raphson method. The fully coupled approach is unconditionally stable, but requires the development of a unified flow-geomechanics simulator and can be computationally expensive. Moreover, it is quite challenging to obtain high-order time approximations using this fully implicit scheme, although matrix free algorithms have been introduced to address some of these issues.

2. Iteratively Coupled (Sequential). Either the flow, or mechanical, problem is solved first, and then the other problem is solved using the intermediate solution information (the bottom of FIG. 3). This sequential procedure is iterated at each time step until the solution converges within an acceptable tolerance. The converged solution is identical to that obtained using the fully coupled approach (i.e., simultaneous solution). In principle, sequential schemes offer several advantages. One can use different domains for the flow and mechanical problems in order to deal with the boundary conditions since the details of the stress field at the reservoir boundaries can be part of the problem. Normally, the domain of the mechanical problem is larger than that for reservoir simulation.

3. Staggered (Single-Pass Sequential). This is a special case of the iteratively coupled method, where only one iteration is taken.

4. Loosely Coupled. The coupling between the two problems is resolved only after a certain number of flow time steps. This method can save computational cost compared with the other strategies, but it is less accurate and requires reliable estimates of when to update the mechanical response.

Any coupling method could be used herein, provided that the compute power and time are available, and sufficient accuracy and adaptability is retained.

FIG. 4 shows the method steps schematically. In step 101 the operator or modeler obtains the relevant coupled model, the coupled model being described in more detail above.

In step 102 key characteristics of the reservoir being modeled are inputted. This step may be preceded by the steps need to obtain the relevant data, but these steps may be performed by another party, not the modeler.

In step 103 flooding simulations are run over a range of injection and productions pressures. Injection rates can be used interchangeably with injection pressures, and the two are considered equivalent herein.

In step 104 the model calculates a number of key parameters over time, including breakthrough tie and cumulative oil production.

In step 105, the optimal pressures or rates are selected based on the acclaimed results of step 104.

In step 106, the optimal values are then used in flooding operations to produce oil from the reservoir that was modeled.

Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system.

Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors.

Slower systems could be used but are less preferred since the processing is already compute intensive.

The results may be displayed in any suitable manner, including printouts, holographic projections, display on a monitor and the like. Alternatively, the results may be recorded to memory for use with other programs, e.g., financial modeling and the like.

Hardware may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system.

Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors, which we normally use with Gedco's Vista™ processing package. Slower systems could be used but are less preferred since such processing and may be compute intensive.

The following references are incorporated by reference in their entirety for all purposes.

SPE-141268-PA (2013) Kim J., et al., Rigorous Coupling of Geomechanics and Multiphase Flow with Strong Capillarity.

SPE-79709 2006): DEAN, R. H. et al., A Comparison of Techniques for Coupling Porous Flow and Geomechanics.

Kim J., SEQUENTIAL METHODS FOR COUPLED GEOMECHANICS AND MULTIPHASE FLOW (Thesis 2010).

Martinez, A. J., et al., Coupled multiphase flow and geomechanics model for analysis of joint reactivation during CO2 sequestration operations, International Journal of Greenhouse Gas Control 17: 148-160 (2013).

See also MINKOFF, SUSAN et al., Coupled fluid flow and geomechanical deformation modeling (Journal of Petroleum Science and Engineering 38 (2003) 34-56).

US20120203524 Quantitative method of determining safe steam injection pressure for enhanced oil recovery operations

What is claimed is:

1. A method of reducing displacing fluid breakthrough in a flooding operation in a weak reservoir, said method comprising:
   a) providing a coupled geomechanics and multiphase flow model for said weak reservoir, said model including at least one injection well and at least one production well and being capable of simulating said flooding operation using a displacing fluid, a rock deformation, and a rock failure criteria in said weak reservoir;
   b) said model comprising:
      i) a reservoir simulator for quantifying displacing fluid flow and oil flow in said flooding operation;
      ii) a geomechanics simulator for quantifying rock deformation and rock failure induced by said flooding operation;
      iii) a constitutive model for simulating rock failure mechanisms including a dilation mechanism, a tensile failure mechanism, and a shear failure mechanism; and
      iv) a permeability model that can quantify a permeability change induced by rock failure;
   c) inputting key physical parameters of said weak reservoir into said model;
   d) simulating flooding operations using said model over a range of injection and production pressures to yield a plurality of simulations;
   e) calculating, for each of said plurality of simulations, a distribution of stress, a strain, a volumetric plastic strain, a porosity, a pressure, a displacing fluid saturation over time, a water breakthrough time, or a cumulative oil production;
f) further calculating for each of said plurality of simulations, a mobility ratio, a sweep efficiency based on said mobility ratio, and a displacement efficiency based on said mobility ratio;
g) selecting an optimal injection and production pressure based on results calculated in step e) and step f); and
h) employing said optimal injection and production pressure in said flooding operation for producing oil from said weak reservoir.

2. The method of claim 1, wherein said key physical parameters include at least two or more of a plurality of characteristics including:
  i) reservoir in-situ stresses including vertical stress, maximum horizontal stress, and minimum horizontal stress;
  ii) reservoir depth and thickness;
  iii) reservoir horizontal and vertical permeability prior to said flooding operation;
  iv) reservoir rock strength parameters, including at least a cohesion and an internal friction angle;
  v) stress strain curves for said weak reservoir under loading conditions of said flooding operation;
  vi) reservoir rock mechanical properties, including at least Young's modulus and Poisson's ratio;
  vii) distances between said at least one injection well and said at least one production well;
  viii) reservoir porosity and pore-pressure prior to said flooding operation;
  ix) injection well pressure and production well pressure during said flooding operation;
  x) reservoir oil compressibility;
  xi) relative permeability curves;
  xii) reservoir oil P-V-T data; or
  xiii) chemistry of displacing fluid.

3. The method of claim 1, wherein said model is fully coupled.
4. The method of claim 1, wherein said model is iteratively coupled.
5. The method of claim 1, wherein said model is staggered.
6. The method of claim 1, wherein said model is loosely coupled.
7. The method of claim 2, wherein said key physical parameters include at least six of the plurality of characteristics.
8. The method of claim 2, wherein said key physical parameters include at least eight of the plurality of characteristics.
9. The method of claim 2, wherein said key physical parameters include at least ten of the plurality of characteristics.
10. The method of claim 1, wherein said rock failure criteria is Mohr-Coulomb criteria.
11. The method of claim 1, wherein said rock failure criteria is Hoeck-Brown criteria, a Drucker-Prager model, Tresca criteria, Von Mises criterion, Weibols and Cook criteria, Modified Lade criteria, or Coulomb-Navier failure criteria.
12. The method of claim 1, wherein said rock failure criteria is experimental and curve fitting based criteria.
13. The method of claim 1, wherein said water breakthrough is avoided more frequently than a similar weak reservoir not employing said method.
14. A non-transitory machine-readable storage medium having a program that, when executed by at least one processor of a computer, reduces displacing fluid breakthrough in a flooding operation in a weak reservoir by:
  a) providing a coupled geomechanics and multiphase flow model for said weak reservoir, said model including at least one injection well and at least one production well and being capable of simulating said flooding operation using a displacing fluid, a rock deformation, and a rock failure criteria in said weak reservoir;
  b) said model comprising:
    i) a reservoir simulator for quantifying displacing fluid flow and oil flow in said flooding operation;
    ii) a geomechanics simulator for quantifying rock deformation and rock failure induced by said flooding operation;
    iii) a constitutive model for simulating rock failure mechanisms including a dilation mechanism, a tensile failure mechanism, and a shear failure mechanism; and
    iv) a permeability model that can quantify a permeability change induced by rock failure;
  c) inputting key physical parameters of said weak reservoir into said model;
  d) simulating flooding operations using said model over a range of injection and production pressures to yield a plurality of simulations;
  e) calculating, for each of said plurality of simulations, a distribution of stress, a strain, a volumetric plastic strain, a porosity, a pressure, a displacing fluid saturation over time, a water breakthrough time, or a cumulative oil production;
  f) further calculating for each of said plurality of simulations, a mobility ratio, a sweep efficiency based on said mobility ratio, and a displacement efficiency based on said mobility ratio;
  g) selecting an optimal injection and production pressure based on results calculated in step e) and step f); and
  h) employing said optimal injection and production pressure in said flooding operation for producing oil from said weak reservoir.

15. The non-transitory machine-readable storage medium of claim 14, wherein said key physical parameters include at least two or more of a plurality of characteristics including a:
  i) reservoir in-situ stresses including vertical stress, maximum horizontal stress, and minimum horizontal stress;
  ii) reservoir depth and thickness;
  iii) reservoir horizontal and vertical permeability prior to said flooding operation;
  iv) reservoir rock strength parameters, including at least a cohesion and an internal friction angle;
  v) stress strain curves for said weak reservoir under loading conditions of said flooding operation;
  vi) reservoir rock mechanical properties, including at least Young's modulus and Poisson's ratio;
  vii) distances between said at least one injection well and said at least one production well;
  viii) reservoir porosity and pore-pressure prior to said flooding operation;
  ix) injection well pressure and production well pressure during said flooding operation;
  x) reservoir oil compressibility;
  xi) relative permeability curves;
  xii) reservoir oil P-V-T data; or
  xiii) chemistry of displacing fluid.

16. The non-transitory machine-readable storage medium of claim 15, wherein said key physical parameters include at least six of the plurality of characteristics.

17. The non-transitory machine-readable storage medium of claim 15, wherein said key physical parameters include at least eight of the plurality of characteristics.

18. The non-transitory machine-readable storage medium of claim 14, wherein said model is fully coupled.

19. The non-transitory machine-readable storage medium of claim 14, wherein said model is iteratively coupled.

20. The non-transitory machine-readable storage medium of claim 14, wherein said rock failure criteria is Mohr-Coulomb criteria, Hoeck-Brown criteria, a Drucker-Prager model, Tresca criteria, Von Mises criterion, Weibols and Cook criteria, Modified Lade criteria, or Coulomb-Navier failure criteria.

* * * * *